US006693942B2

(12) United States Patent
Krupke

(10) Patent No.: US 6,693,942 B2
(45) Date of Patent: Feb. 17, 2004

(54) DIODE-PUMPED VISIBLE WAVELENGTH ALKALI LASER

(76) Inventor: William F. Krupke, 1564 Foothill Rd., Pleasanton, CA (US) 94588

( * ) Notice: Subject to any disclaimer, the term of this patent is extended or adjusted under 35 U.S.C. 154(b) by 0 days.

(21) Appl. No.: 10/024,127

(22) Filed: Dec. 17, 2001

(65) Prior Publication Data

US 2003/0081644 A1 May 1, 2003

Related U.S. Application Data

(63) Continuation-in-part of application No. 10/000,508, filed on Oct. 23, 2001.

(51) Int. Cl.$^7$ .......................... H01S 3/094; H01S 3/091
(52) U.S. Cl. ............................. 372/75; 372/55; 372/56; 372/70
(58) Field of Search .......................... 372/55, 56, 70, 372/75

(56) References Cited

U.S. PATENT DOCUMENTS

| | | | | |
|---|---|---|---|---|
| 3,816,754 A | * | 6/1974 | Hodgson et al. | 307/88.3 |
| 4,151,486 A | * | 4/1979 | Itzkan et al. | 331/94.5 |
| 4,949,348 A | * | 8/1990 | Nguyen et al. | 372/41 |
| 5,283,800 A | * | 2/1994 | Suzuki et al. | 372/60 |
| 6,167,068 A | * | 12/2000 | Caprara et al. | 372/22 |
| 6,331,993 B1 | | 12/2001 | Brown | 372/55 |

OTHER PUBLICATIONS

J. Cuvellier, et al; Inelastic collisions involving excited cesium atoms at thermal energies; Mar. 1975; Physical Review A, vol. 11, No. 3; pp. 846–855.*

Z. Konefal and M. Ignaciuk; Stimulated Collision Induced Processes in Sodium Vapor in the Presence of Helium; May 11, 1990; Applied Physics B, Photo–physics and Laser Chemistry.*

Sweta Dash, "Market Trends in the Projection Display Industry", Proc. SPIE, 4294, 1 (2001).

D. Hargis and A. Earman, "Diode Pumped Microlasers Promise Portable Projectors", Laser Focus World, pp. 243–251, May 1999.

Y. Kitaoka, et. al., "Miniaturized Blue Laser Using Second Harmonic Generation", Jpn. J. Appl. Phys., 39, 3416 (2000).

I. Savatinova, S. Tonchev, and P. Kircheva, "Photorefractive Optical Damage in Protonated LiNbO$_3$ Waveguides". Ferroelectrics, 249, 257 (2001).

A. E. Bell, "The Dynamic Digital Disk", IEEE Spectrum, Oct., pp. 28–35 (1999).

R. T. Kate, "Standards for 12 cm optical disks", SPIE, 4085, 277 (2001).

(List continued on next page.)

Primary Examiner—Paul Ip
Assistant Examiner—Leith A Al Nazar
(74) Attorney, Agent, or Firm—John P. Wooldridge

(57) ABSTRACT

In the basic Diode-Pumped Alkali Laser (DPAL) device, excitation to the n $^2P_{3/2}$ electronic level by a single diode laser pump source leads to a population inversion between the first excited electronic $^2P_{1/2}$ level and the ground $^2S_{1/2}$ level, permitting the construction of efficient, high-power, compact DPAL laser oscillators in the near infrared spectral region. The present invention extends the single-step excitation DPAL to a two-step excitation, or up-conversion DPAL to produce efficient, powerful laser operation in the visible blue and near UV spectral regions (viz., in the range 460–323 nm). The present invention describes an apparatus and method that efficiently sums the energy of two, near-infrared diode pump photons in alkali vapor atoms, followed by stimulated emission to their electronic ground levels.

25 Claims, 2 Drawing Sheets

OTHER PUBLICATIONS

I. Aoki, "A Study on the Read/Write Experimental Results for a High Definition Video Disk (DVD) Recorder using Blue Laser Diode", Jpn. J. Appl. Phys., 40, 1817 (2001).

S. Nagahama, et al., "GaN–Based Violet Laser Diodes", SPIE, 4287, 41 (2001).

J. Ashley, et al., "Holographic Data Storage", IBM J. Res. Develop., 44, 341 (2000).

W. F. Krupke, Diode–Pumped Alkali Laser, U.S patent application Ser. No. 10.000,508, Filed Oct. 23, 2001.

P. S. Doidge, "A Compendium and Critical Review of Neutral Atom Resonance Line Oscillator Strengths for Atomic Absorption Analysis", Spectrochemica Acta., 50B, 209(1995).

S. Ch'en and M Takeo, "Broadening and Shift of Spectral Lines Due to the Presence of Foreign Gases", Rev. Mod. Phys., 29, 20 (1957).

W. R. Hindmarsh and J. M. Farr, "Collision Broadening of Spectral Lines by Neutral Atoms", Prog. In Quantum Electronics, 2, 141 (1972).

R. O. Garrett and S. Y. Ch'en, "Pressure Effects of Foreign Gases on the Absorption Lines of Cesium. II. The Effects of Helium on the First Two Members of the Principal Series", Phys. Rev., 144, 66 (1966).

M. D. Rotondaro and G. P. Perram, "Collisional Broadening and Shift of the Rubidium $D_1$ and $D_2$ Lines by Rare Gases, $H_2$, $D_2$, $N_2$, $CH_4$, and $CF_4$", J. Quant. Radiat. Transfer, 57, 497 (197).

L. Krause, "Collisional Excitation Transfer Between the $^2P_{1/2}$ and $^2P_{3/2}$ Levels in Alkali Atoms", Applied Optics, 5, 1375 (1966).

E. S. Hrycyshyn and L. Krause, "Inelastic Collisions Between Excited Alkali Atoms and Molecules, VII. Sensitized Fluorescence and Quenching in Mixtures of Rubidium with $H_2$, HD, $D_2$, $N_2$, $CH_4$, $CD_4$, $C_2$, H4, and $C_2H_6$.", Can. J. Phys., 48, 2761 (1970).

E. Walentynowicz, et. al., "Inelastic Collisions Between Excited Alkali Atoms and Molecules X. Temperature Dependence of Cross Sections for $^2P_{1/2}$—$^2P_{3/2}$ Mixing in Cesium, Induced in Collisions with Deuterated Hydrogens, Ethanes, and Propanes", Can. J. Phys., 52, 589 (1974).

Z. Konefal, "Observation of Collision Induced Processes in Rubidium–Ethane Vapour", Optics Communications, 164, 95 (1999).

I. N. Siara, H. S. Kwong, and L Krause, "Sensitized Fluorescence in Vapors of Alkali Atoms XIV. Temperature Dependence of Cross Sections for 7 $^2P_{1/2}$ —7 $^2P_{3/2}$ Mixing in Cesium, Induced in Collisions with Noble Gas Atoms", Can. J. Phys. 52, 945 (1974).

J. F. Kielkopf, "Excitation, transfer, lifetimes, and satellite bands in Cs(7p)–Xe collisions", J. Chem. Phys., 62, 4809 (1976).

P. Muenster and J. Marek, "Determination of cross sections of excitation transfer between the fine–structure components of Cs(7 $^2P$), Rb(6 $^2P$), and Rb(7 $^2P$) induced bt collisions with rare–gas atoms", J. Phys. B: At. Mol. Phys., 14, 1009 (1981).

J. Cuvellier, P. R. Fournier, F. Gounand, J. Pascale, and J. Berlande, "Inelastic collisions involving excited cesium atoms at thermal energies", Phys. Rev., A11, 846 (1975).

E. Speller, B. Staudenmayer, and V. Kempter, "Quenching Cross Sections for Alkali–Inert Gas Collisions", Z. Phys., A291, 311 (1979).

R. J. Beach, "CW Theory of Quasi–Three–Level End–Pumped Laser Oscillators", Opt. Commun., 123, 385 (1995).

* cited by examiner

DIODE-PUMPED VISIBLE WAVELENGTH ALKALI LASER

This is a continuation-in-part of U.S. patent application Ser. No. 10/000,508 is still pending, titled "Diode-Pumped Alkali Laser" filed Oct. 23, 2001 and incorporated herein by reference.

BACKGROUND OF THE INVENTION

1. Field of the Invention

The present invention relates to visible and near ultraviolet wavelength lasers, and more specifically to diode-pumped up-conversion alkali lasers (DPALs).

2. Description of Related Art

With the coming of the Internet and the explosive growth in data communications it enabled, there has been a concomitant growth in the demand for ever-more capable visual displays in the form of electronic cinema, home theater, desktop, and mobile displays. The growth in data generation and communications has also created an accelerating demand for high density data storage, taking many physical forms including optical data storage in video DVD disks, and in optically written holograms in polymer coated disks. Advanced realizations of high-performance displays and data storage call for the use of compact, efficient, and low-cost visible and near ultraviolet laser sources. Direct view displays based on lasers require laser sources emitting in the red, green, and blue spectral regions. Optical data storage recording media achieve high recording density by making small spots in the recording medium, whose spot diameter depends inversely in the square of the wavelength of the laser-marking source. Thus optical data storage devices benefit from compact, efficient shorter wavelength laser sources. DVD disks originally utilized semiconductor laser diodes operating at 780 nm, progressed in recent times to a wavelength of 650 nm, and call for laser sources that will emit at a wavelength near ~400 nm in the near future. Thus there are continuing, and growing needs for compact, efficient, and cost-effective visible and near ultraviolet laser sources.

More specifically, there is a large and growing demand for commercial projection displays [1] with ever-higher technical performance characteristics (higher resolution, higher brightness, larger screen size, more saturated color gamut, higher efficiency, and lower cost, etc.). The xenon arc lamp found in most projection displays is technologically the weakest link in achieving displays with the desired characteristics. The arc lamp is generally limited in brightness because its output light is radiated into all spatial directions, is inefficient in producing useful visible light, produces a great amount of waste heat, and has an awkwardly short lifetime usually measured in 100's of hours.

Visible red, green, and blue (RGB) laser sources offer the prospect for overcoming most of the shortcomings of incoherent arc lamp sources. Lasers are comparatively much brighter than lamps, emit relatively pure colors that enable very high gamut saturation, and can be scaled in output power sufficient to project bright high-resolution images on very large screens. The most developed visible laser sources for projection displays are based on diode-pumped solid state lasers, or DPSSLs, (such as Nd:YVO$_4$), The near infrared radiation from the DPSSL is frequency-doubled in a nonlinear crystal, producing either red (~640 nm), green (~532 nm) or blue (473 nm) visible light [2]. These laser sources have working efficiencies of 2–5 percent, produce output powers up to the watt range, but have proven to be many times too expensive for wide-spread use in consumer display applications.

Lower power (10–100 mW) laser-based visible sources are being developed, based on direct frequency doubling of the near-infrared radiation from a stripe laser diode in a nonlinear crystal [3]. At these lower powers it is necessary to use a guided wave structure fabricated in the nonlinear harmonic doubler crystal, so that a sufficient interaction length is provided for significant harmonic generation. The most promising results regarding output power and conversion efficiency have been obtained using quasi-phase-matched periodically-poled nonlinear materials such a lithium niobate and lithium tantalate [3]. In these devices, the near diffraction-limited radiation from the stripe laser diode is focused into a channel waveguide (a few microns in width) that is fabricated in a planar wafer made of the nonlinear converter crystal. In order to achieve reasonable conversion efficiencies (10–20% or so) the fundamental wave in the waveguide must have an intensity of at least a few hundred kW/cm$^2$. Such an intensity is high enough that light-induced photorefraction occurs. This phenomenon spoils the phase-matching condition for efficient harmonic generation and greatly limits the operating lifetime of the device, especially at the higher output levels [4]. This problem has proven to be most difficult in generating shorter visible wavelengths (e.g., s blue). Also the precision required to fabricate micron scale diode stripe lasers and couple them efficiently into narrow width single-mode waveguides is a challenging and relatively expensive task to perform.

Thus, the market demand for relatively lower-cost, compact, efficient, high-power (0.1 to 10 watts), and long-lived (>>20,000 hours) visible (especially blue) laser sources continues unfulfilled. The present invention is offered as a solution to this market need.

In addition to high performance displays, consumer demand has continued to grow in the past decade [5] for video DVD disks with ever-higher recording densities. Commercial video DVD disks containing a full 2 hour-long feature film have been realized with the development of red (~650 nm) laser diodes. Future higher density DVD (or DVR) disks [6] are awaiting the development of a compact, efficient laser source emitting at a shorter wavelength (~420–400 nm). Laser diodes produced from the AlGaInN compound semiconductor material system are in early development for this application. AlGaN laser diodes emitting several tens of milliwatts at a wavelength of ~410 nm have been demonstrated [7] and are in early commercial evaluation. While technically adequate, the current manufacturing methods of such diodes is a low-yield process, owing to the lack of a suitably lattice-matched substrate upon which to epitaxially grow these laser diode devices [8]. Thus, novel compact, efficient, low-cost laser sources in the 420–400 nm spectral region continue to be of commercial interest.

In addition to video DVD disk recorders and players, yet higher data density and access rates are needed to implement massive data storage devices for data rich computer network applications. Holographic data storage techniques have been under intense development in the past decade, and new polymer recording media have been developed for commercial and consumer products [9]. Holographic data storage devices will require practical, short wavelength (~400–410 nm) lasers emitting several tens of up to a ~100 milliwatts of laser power. Such laser sources are also useful as a compact fluorescence excitation source for various biomedical research and diagnostic applications (such as cancer detection, DNA sequencing, and reading proteomic assays, etc.).

In light of the foregoing, needs continue for the invention and development of efficient, compact, long-lived, visible laser sources operating in the ~400–470 nm spectral range. The present invention addresses those needs.

SUMMARY OF THE INVENTION

It is an object of the present invention to provide an up-conversion diode-pumped alkali laser (UC-DPAL.

It is another object of the invention to provide to provide a laser cavity formed by an input mirror and an output mirror, resonant at a wavelength $\lambda_{o3}$ or $\lambda_{o4}$ corresponding to wavelengths of the $D_{1'}$ or $D_{2'}$ transitions of an alkali atomic vapor.

Another object of the invention is to provide a gain medium within a resonant cavity, where the gain medium comprises a mixture of one or more buffer gases and an alkali vapor whose $D_{1'}$ or $D_{2'}$ transition wavelengths match that of the resonant laser cavity.

Still another object of the invention is to provide a semiconductor diode pump laser (or laser array) emitting at a wavelength suitable for optically exciting a laser gain mixture of one or more buffer gases and an alkali vapor.

Another object of the invention is to provide a semiconductor diode pump laser (or laser diode array) emitting at a wavelength suitable for further optically exciting alkali atoms excited by a first pump laser, to the n $^2D_{3/2}$ (or similar) electronic level of the alkali atom.

Another object of the invention is to provide a method for converting the substantially-divergent, multi-spatial-mode radiation of semiconductor diode laser pump arrays into a near diffraction-limited, near-single-spatial-mode, coherent laser radiation at a wavelength shorter than those of either pump.

These and other objects will be apparent to those skilled in the art based on the disclosure herein.

The use of an alkali atomic vapor element as laser active specie in a near infrared Diode-Pumped Alkali Laser (DPAL) has been disclosed [10] in U.S. patent application Ser. No. 10/000,508, titled "Diode-Pumped Alkali Laser" filed Oct. 23, 2001, and incorporated herein by reference. In the basic DPAL device, excitation to the n $^2P_{3/2}$ electronic level by a single diode laser pump source leads to a population inversion between the first excited electronic $^2P_{1/2}$ level and the ground $^2S_{1/2}$ level, permitting the construction of efficient, high-power, compact DPAL laser oscillators in the near infrared spectral region. The present invention extends the single-step excitation DPAL to a two-step excitation, or up-conversion DPAL to produce efficient, powerful laser operation in the visible blue and near UV spectral regions (viz., in the range 460–323 nm). The present invention describes an apparatus and method that efficiently sums the energy of two, near-infrared diode pump photons in alkali vapor atoms, followed by stimulated emission to their electronic ground levels.

In the basic infrared DPAL, only the ground and first two excited energy levels are involved in laser action. In the UC-DPAL device, additional higher lying electronic levels are involved in generating visible laser emission. In the UC-DPAL device, two diode pump sources are utilized. The first pump, $P_1$, is set to the wavelength of either of the first resonance (so-called) $D_1$ or $D_2$ transition wavelengths ($D_1$: n $^2S_{1/2}$–n $^2P_{1/2}$, or $D_2$: n $^2S_{1/2}$–n$^2P_{3/2}$). The second pump, $P_2$, is set to a wavelength that equals the wavelength of a transition between either the n $^2P_{1/2}$ level or the n $^2P_{3/2}$ level, and the n $^2D_{3/2}$ level (or possibly another $^2D_{J'}$ level, not shown). With both pump excitation sources present, alkali atoms are successively excited from the ground n $^2S_{1/2}$ electronic level, into either the n $^2P_{1/2}$ or n $^2P_{3/2}$ levels, and subsequently into the n $^2D_{3/2}$ level. In the presence of an appropriate buffer gas mixture, the alkali atom populations excited to the n $^2P_{1/2}$ and n $^2P_{3/2}$ levels come into thermal equilibrium with each other, characterized by a temperature equal to that of the buffer gas, due to rapid collisional mixing (exchange of energy) between these levels by the buffer gas. Similarly, due to collisional mixing among the n $^2D_{3/2}$, n+1 $^2P_{1/2}$ and n+1 $^2P_{3/2}$ levels due to presence of an appropriate buffer gas, the alkali atom population excited by the second step pump rapidly comes to thermal equilibrium with the latter two levels, characterized by the temperature of the buffer gas. With the appropriate excitation fluxes from the first and second diode pump sources, a population inversion is generated between the n+1 $^2P_{1/2}$ and n+1 $^2P_{3/2}$ levels and the ground n $^2S_{1/2}$ level. When the doubly-excited alkali/buffer-gas mixture is contained with an appropriate laser cavity, laser action is generated in either of the two "second series D'-transitions" of the alkali atoms: $D_{1'}$: n+1 $^2P_{1/2}$–n $^2S_{1/2}$; $D_{2'}$: n+1 $^2P_{3/2}$–n $^2S_{1/2}$.

DETAILED DESCRIPTION OF THE INVENTION

Figure 1:
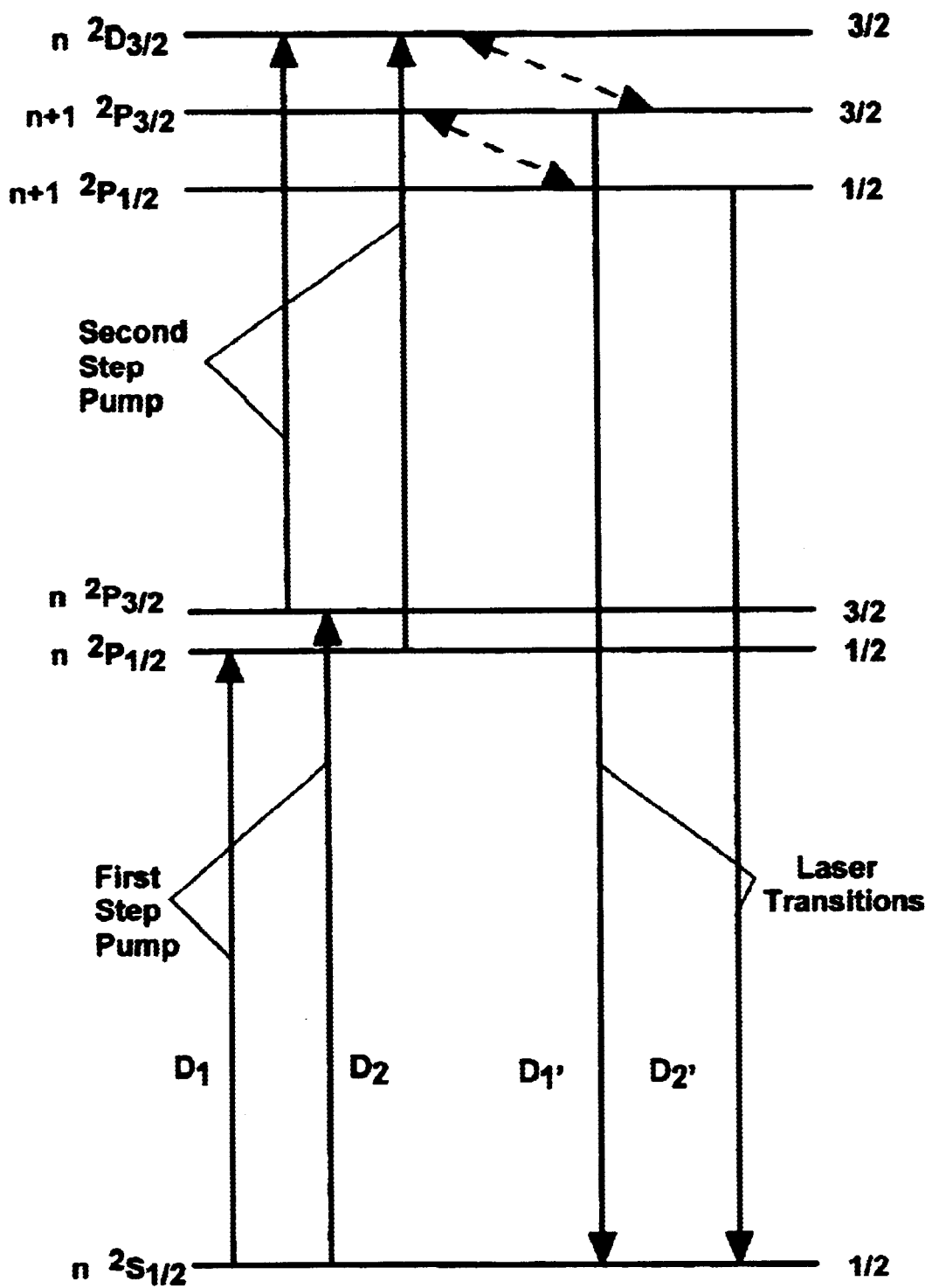
FIG. 1 shows the ground n $^2S_{1/2}$, first two excited n $^2P_{1/2;3/2}$ electronic energy levels, and the three next-higher lying levels (n+1 $^2P_{1/2;3/2}$; n $^2D_{3/2}$) of the alkali atoms. These levels are involved in the up-conversion laser action of the present invention.

The energy level scheme for the up-conversion DPAL (or UC-DPAL) is shown in FIG. 1. In the basic infrared DPAL [10], only the ground and first two excited energy levels are involved in laser action. In the UC-DPAL device, additional higher lying electronic levels are involved in generating visible laser emission. In FIG. 1, n is the principal quantum number of the alkali atoms (n=2,3,4,5,6 for lithium, sodium, potassium, rubidium, and cesium, respectively). In the UC-DPAL device, two diode pump sources are utilized. The first pump, $P_1$, is set to the wavelength of either of the first resonance (so-called) $D_1$ or $D_2$ transition wavelengths ($D_1$: n $^2S_{1/2}$–n $^2P_{1/2}$, or $D_2$: n $^2S_{1/2}$–n$^2P_{3/2}$). The second pump, $P_2$, is set to a wavelength that equals the wavelength of a transition between either the n $^2P_{1/2}$ level or the n $^2P_{3/2}$ level, and the n $^2D_{3/2}$ level (or possibly another $^2D_{J'}$ level, not shown). With both pump excitation sources present, alkali atoms are successively excited from the ground n $^2S_{1/2}$ electronic level, into either the n $^2P_{1/2}$ or n $^2P_{3/2}$ levels, and subsequently into the n $^2D_{3/2}$ level. In the presence of an appropriate buffer gas mixture (see below), the alkali atom populations excited to the n $^2P_{1/2}$ and n $^2P_{3/2}$ levels come into thermal equilibrium with each other, characterized by a temperature equal to that of the buffer gas, due to rapid collisional mixing (exchange of energy) between these levels by the buffer gas. Similarly, due to collisional mixing among the n $^2D_{3/2}$, n+1 $^2P_{1/2}$ and n+1 $^2P_{3/2}$ levels due to presence of an appropriate buffer gas, the alkali atom population excited by the second step pump rapidly comes to thermal equilibrium with the latter two levels, characterized by the temperature of the buffer gas. With the appropriate excitation fluxes from the first and second diode pump sources, a population inversion is generated between the n+1

$^2P_{1/2}$ and n+1 $^2P_{3/2}$ levels and the ground n $^2S_{1/2}$ level. When the doubly-excited alkali/buffer-gas mixture is contained with an appropriate laser cavity, laser action is generated in either of the two "second series D'-transitions" of the alkali atoms: $D_{1'}$: n+1 $^2P_{1/2}$–n $^2S_{1/2}$; $D_{2'}$: n+1 $^2P_{3/2}$–n $^2S_{1/2}$.

The required pump fluxes for efficient laser action in the $D_{1'}$ or $D_{2'}$, transitions of an alkali atom depends directly on the collision-broadened spectral widths, effective transition cross-sections, and the saturation fluxes of the pump and laser transitions, which in turn depend on the type and partial pressures of the buffer gases utilized. The spectroscopic properties of the first and second series D-transitions of the alkali vapor atoms have been extensively studied [11], first as model systems of atomic structure, and more recently as preferred species for producing Bose-Einstein condensates. Likewise, also extensively studied have been the collisional effects of all of the rare-gases and selected molecular gases on the spectroscopic and population kinetics of excited alkali atoms, including spectral broadening of the D-line transitions [11–15], collisional mixing rates of excited $^2P_{1/2,3/2}$ alkali atoms [16–23], and inelastic quenching rates of excited alkali atoms [24].

here $l_{03}$ or $l_{04}$) of the UC-DPAL. The diode pump sources 1 and 2 are collimated with lenses 3 and 4, respectively, spatially combined by the thin-film polarizer or dichroic beam combiner optic 11, and focused into the laser gain cell by lens 5, through laser cavity mirror 6. The laser cavity mirror 6 is coated with a dielectric stack that produces high reflectivity at the UC-DPAL laser wavelength, and high transmission in the near infrared wavelengths of the two pumps. The laser cavity output mirror 7 is coated with a dielectric stack that highly reflects in the near infrared at the two pump wavelengths, and partially transmits at the UC-DPAL laser wavelength (with a reflectivity that optimizes the conversion efficiency of diode pump light to blue laser output).

The main purpose of the buffer gas is two-fold: 1) the buffer gas collisionally broadens the optical transitions, renders the transitions spectrally homogeneous with predominantly Lorentzian lineshapes, and facilitates increased spectral coupling between the pump radiation and alkali atom absorption; and 2), the buffer gas collisionally relaxes doubly-excited alkali atoms from the $^2D_{3/2}$ level to the n+1 $^2P_{1/2}$ and $^2P_{3/2}$ levels (the upper laser levels for the two

TABLE 1

UC-DPAL relevant electronic level energies and transition wavelengths.

| n | Alkali | $E_1$ (cm$^{-1}$) | $E_2$ (cm$^{-1}$) | $E_3$ (cm$^{-1}$) | $E_4$ (cm$^{-1}$) | $E_5$ (cm$^{-1}$) | $\Delta E_{54}$ (cm$^{-1}$) |
|---|---|---|---|---|---|---|---|
| 6 | Cs | 11,178.2 | 11,732.4 | 21,765.7 | 21,946.7 | 22,588.9 | 642.2 |
| 5 | Rb | 12,578.9 | 12,816.4 | 23,715.2 | 23,792.7 | 25,700.6 | 1,907.6 |
| 4 | K  | 12,985.2 | 13,042.9 | 24,701.4 | 24,720.2 | 30,185.6 | 5,465.4 |
| 3 | Na | 16,956.2 | 16,973.4 | 30,266.9 | 30,272.5 | 34,548.8 | 4,276.3 |
| 2 | Li | 14,903.7 | 14,904.0 | 30,925.3 | 30,925.4 | 31,283.1 | 357.7 |

| n | Alkali | $\lambda_{pump,01}$ (nm) | $\lambda_{pump,02}$ (nm) | $\lambda_{pump,15}$ (nm) | $\lambda_{pump,25}$ (nm) | $\lambda_{laser,03}$ (nm) | $\lambda_{laser,04}$ (nm) |
|---|---|---|---|---|---|---|---|
| 6 | Cs | 894.6 | 852.3 | 876.4 | 921.6 | 459.4 | 455.6 |
| 5 | Rb | 795.0 | 780.3 | 762.1 | 776.1 | 421.7 | 420.3 |
| 4 | K  | 770.1 | 877.7 | 581.4 | 583.3 | 404.8 | 404.5 |
| 3 | Na | 589.8 | 589.2 | 568.4 | 569.0 | 330.4 | 330.3 |
| 2 | Li | 671.0 | 671.0 | 610.5 | 610.5 | 323.4 | 323.4 |

Table 1 gives a summary of the electronic level energies and corresponding transition wavelengths relevant to UC DPAL devices. From Table 1, it is noted (in italics) that the demand pump wavelengths for the cesium and rubidium UC-DPALs lie in the 762–921 nm spectral range, for which powerful and efficient high power laser diode and diode arrays are commercially available. Therefore, these particular alkali atoms are preferred alkali atoms for practical UC-DPAL devices.

Figure 2:
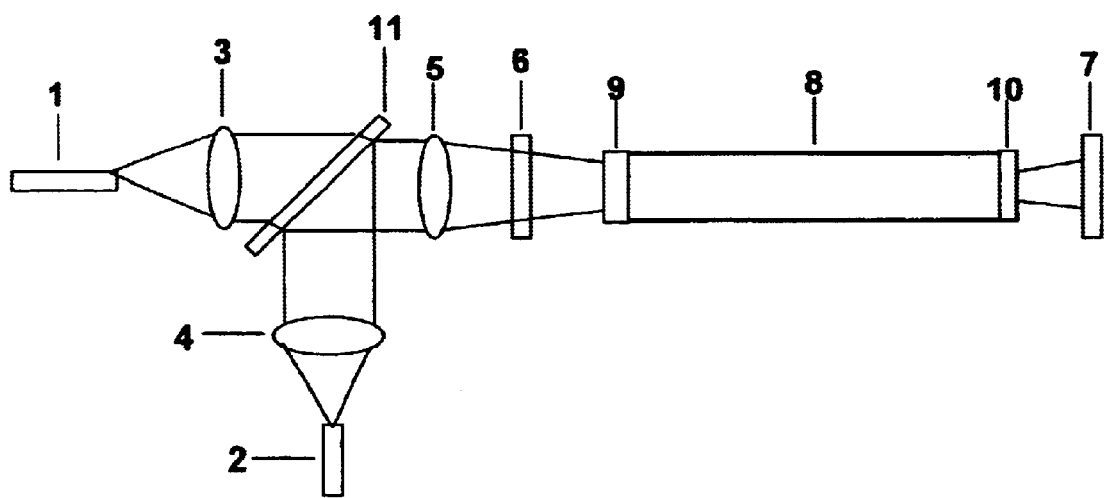
FIG. 2 shows the functional elements of the up-conversion, diode-pumped alkali laser (UC-DPAL).

The basic functional elements of an UC-DPAL device are shown in FIG. 2. The UC-DPAL laser gain cell 8 contains the laser active alkali vapor and an appropriate buffer gas (e.g., a mixture of a rare gas such as helium and a selected molecular gas a such as ethane). Generally, the gain cell 8 will have a length "L" and transverse cross-section that is generally circularly symmetric with radius "r", and having an aspect ratio, L/r, of typically >10. However, the cross-sectional shape of the gain cell may take many forms (circular, square, rectangular, or higher polygonal form) and may also be designated as a tube, capillary, hollow-waveguide, etc. The gain cell is fitted with flat optical windows 9 and 10 at either end so as to contain the alkali atomic vapor. The cell windows 9 and 10 are coated on their exterior surfaces with a multilayer dielectric stack to form an anti-reflection coating at both of the pumping wavelengths, and at the operating laser wavelength (either put lambda UC-DPAL laser transitions, n+1 $^2P_{3/2}$–n $^2S_{1/2}$ or the n+1 $^2P_{1/2}$–n $^2S_{1/2}$. The buffer gas composition and density is chosen so that this relaxation rate substantially exceeds the radiative relaxation rate of the $^2D_{3/2}$ level.

For example, using atomic collision data from the literature [11–24], a suitable buffer gas mixture for a cesium UC-DPAL is ~1–2 atm of helium and ~0.1 atm of ethane. Such a buffer mixture can sufficiently relax the excited populations to the desired levels before significant undesired radiative emission takes place.

Up-conversion laser action can be efficient in the UC-DPAL because the ground level population can be readily bleached using commercially available laser diodes, and substantial population inversions (and small signal gain) can be produced on the n+1 $^2P_{3/2}$–n $^2S_{1/2}$ and the n+1 $^2P_{1/2}$–n $^2S_{1/2}$ transition. To gain insight into the laser performance of UC-DPAL devices, it is necessary to construct a computer code capable of tracking alkali level populations in all of the relevant energy levels (those strongly coupled together by the radiation fields of the two spatially-overlapping pump beams, and by the simultaneous oscillation and saturation of level populations due to laser action within the laser cavity [25]). It is because the magnitudes of the collisionally-broadened alkali atom pump transition peak cross-sections are large (>$10^{-13}$ cm$^2$), and that the corresponding population saturation fluxes are small (~30 watts/cm², relative to pump fluxes available with pump laser diodes) that substantial and practical amounts of pump radiation absorption can be achieved within the Lorentzian wings of the transitions, thus enabling practical UC-DPAL designs.

References

[1] Sweta Dash, "Market Trends in the Projection Display Industry", Proc. SPIE, 4294, 1 (2001).

[2] D. Hargis and A. Earman, "Diode Pumped Microlasers Promise Portable Projectors", Laser Focus World, pp243–251, May 1999.

[3] Y. Kitaoka, et al., "Miniaturized Blue Laser Using Second Harmonic Generation", Jpn. J. Appl. Phys., 39, 3416 (2000)

[4] I. Savatinova, S. Tonchev, and P. Kircheva, "Photorefractive Optical Damage in Protonated $LiNbO_3$ Waveguides". Ferroelectrics, 249, 257 (2001).

[5] A. E. Bell, "The Dynamic Digital Disk", IEEE Spectrum, October, pp28–35 (1999)

[6] R. T. Kate, "Standards for 12 cm optical disks", SPIE, 4085, 277 (2001).

[7] I. Aoki, "A Study on the Read/Write Experimental Results for a High Definition Video Disk (DVD) Recorder using Blue Laser Diode", Jpn. J. Appl. Phys., 40,1817 (2001).

[8] S. Nagahama, et al., "GaN-Based Violet Laser Diodes", SPIE, 4287,41 (2001).

[9] J. Ashley, et al., "Holographic Data Storage", IBM J. Res. Develop., 44, 341 (2000).

[10] W. F. Krupke, Diode-Pumped Alkali Laser, Patent Application, Oct. 23, 2001

[11] P. S. Doidge, "A Compendium and Critical Review of Neutral AtomResonance Line Oscillator Strengths for Atomic Absorption Analysis", Spectrochemica Acta., 50B, 209 (1995)

[12] S. Ch'en and M Takeo, "Broadening and Shift of Spectral Lines Due to the Presence of Foreign Gases", Rev. Mod. Phys., 29, 20 (1957).

[13] W. R. Hindmarsh and J. M. Farr, "Collision Broadening of Spectral Lines by Neutral Atoms", Prog. In Quantum Electronics, 2, 141 (1972)

[14] R. O. Garrett and S. Y. Ch'en, "Pressure Effects of Foreign Gases on the Absorption Lines of Cesium. II. The Effects of Helium on the First Two Members of the Principal Series", Phys. Rev., 144, 66 (1966).

[15] M. D. Rotondaro and G. P. Perram, "Collisional Broadening and Shift of the Rubidium $D_1$ and $D_2$ Lines by Rare Gases, $H_2$, $D_2$, $N_2$, $CH_4$, and $CF_4$", J. Quant Radiat. Transfer, 57, 497 (197).

[16] L. Krause, "Collisional Excitation Transfer Between the $^2P_{1/2}$ and $^2P_{3/2}$ Levels in Alkali Atoms", Applied Optics, 5, 1375 (1966).

[17] E. S. Hrycyshyn and L. Krause, "Inelastic Collisions Between Excited Alkali Atoms and Molecules, VII. Sensitized Fluorescence and Quenching in Mixtures of Rubidium with H2, HD, $D_2$, $N_2$, $CF_4$, $CD_4$, $C_2$, H4, and $C_2H_6$.", Can. J. Phys., 48, 2761 (1970).

[18] E. Walentynowicz, et al., "Inelastic Collisions Between Excited Alkali Atoms and Molecules X. Temperature Dependence of Cross Sections for $^2P_{1/2}$–$^2P_{3/2}$ Mixing in Cesium, Induced in Collisions with Deuterated Hydrogens, Ethanes, and Propanes", Can. J. Phys., 52, 589 (1974).

[19] Z. Konefal, "Observation of Collision Induced Processes in Rubidium-Ethane Vapour", Optics Communications, 164, 95 (1999).

[20] I. N. Siara, H. S. Kwong, and L Krause, "Sensitized Fluorescence in Vapors of Alkali Atoms XIV. Temperature Dependence of Cross Sections for 7 $^2P_{1/2}$–7 $^2P_{3/2}$ Mixing in Cesium, Induced in Collisions with Noble Gas Atoms", Can. J. Phys., 52, 945 (1974).

[21] J. F. Kielkopf, "Excitation, transfer, lifetimes, and satellite bands in Cs(7p)-Xe collisions", J. Chem. Phys., 62,4809 (1976).

[22] P. Muenster and J. Marek, "Determination of cross sections of excitation transfer between the fine-structure components of Cs(7 $^2P$), Rb(6 $^2P$), and Rb(7 $^2P$) induced bt collisions with rare-gas atoms", J. Phys. B: At. Mol. Phys., 14, 1009 (1981).

[23] J. Cuvellier, P. R. Fournier, F. Gounand, J. Pascale, and J. Berlande, "Inelastic collisions involving excited cesium atoms at thermal energies", Phys. Rev., A11, 846 (1975).

[24] E. Speller, B. Staudenmayer, and V. Kempter, "Quenching Cross Sections for Alkali-Inert Gas Collisions", Z. Phys., A291, 311 (1979).

[25] R. J. Beach, "CW Theory of Quasi-Three-Level End-Pumped Laser Oscillators", Opt Commun., 123, 385 (1995).

All of the references cited herein are incorporated herein by reference.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

I claim:

1. An up-conversion diode-pumped alkali laser (UC-DPAL), comprising:

a laser cavity formed by an input mirror and an output minor, resonant at a wavelength $\lambda_{o3}$ or $\lambda_{o4}$ corresponding to wavelengths of the $D_{1'}$ or $D_{2'}$ transitions of an alkali atomic vapor;

a gain medium within said resonant cavity, said gain medium comprising a mixture of one or more buffer gases and an alkali vapor whose $D_{1'}$ or $D_{2'}$ transition wavelengths match that of said resonant laser cavity, wherein said mixture collisionally broadens the optical transitions, renders the transitions spectrally homogeneous with predominantly Lorentzian lineshapes, and facilitates increased spectral coupling between the pump radiation and alkali atom absorption, wherein the buffer gas collisionally relaxes doubly-excited alkali atoms from the $^2D_{3/2}$ level to the n+1 $^2P_{1/2}$ and $^2P_{3/2}$ levels (the upper laser levels for the two UC-DPAL laser transitions, n+1 $^2P_{3/2}$–n $^2S_{1/2}$ or the n+1 $^2P_{1/2}$–n $^2S_{1/2}$), and wherein the buffer gas composition and density are chosen so that this relaxation rate substantially exceeds the radiative relaxation rate of the $^2D_{3/2}$ level;

a first continuous wave (CW) semiconductor diode pump laser (or a first (CW) laser diode array) emitting at a wavelength suitable for optically exciting said alkali vapor at a wavelength of the first series $D_1$ or $D_2$ transitions of said alkali vapor, wherein said first CW semiconductor diode pump laser (or said first CW laser diode array) is operably positioned for optically exciting said alkali vapor; and a second CW semiconductor diode pump laser (or a second CW laser diode array) emitting at a wavelength suitable for further optically exciting alkali atoms excited by said first CW semiconductor diode pump laser, to the n $^2D_{3/2}$ (or similar) electronic level of the alkali atom, said first CW semiconductor diode pump laser (or said first CW laser diode array) and said second CW semiconductor diode pump laser (or said second CW laser diode array) together producing a population inversion and laser emission at the wavelength of the second series $D_{1'}$ or $D_{2'}$ transitions of said alkali vapor, wherein said second CW semiconductor diode pump laser (or said second CW laser diode array) is operably directed onto said alkali vapor.

2. The alkali vapor laser set forth in claim 1, wherein said alkali vapor is selected from the group consisting of cesium (Cs), rubidium (Rb), potassium (K), sodium (Na) and lithium (Li).

3. The alkali vapor laser set forth in claim 1, wherein said one or more buffer gases are selected from the group consisting of 1) the subgroup of rare gases (xenon, krypton, argon, neon, and helium) and/or 2) the subgroup of light molecular gases (hydrogen, methane, ethane, propane; and their deuterated analogues).

4. The alkali vapor laser of claim 1, wherein said output mirror of said laser cavity is partially transmitting at a wavelength $\lambda_{o3}$ or $\lambda_{o4}$ matching the wavelengths of said second series $D_{1'}$ or $D_{2'}$ transitions of said alkali vapor, permitting out-coupling of laser radiation generated within said optically pumped alkali vapor laser at a wavelength of $\lambda_{o3}$ or $\lambda_{o4}$, wherein said output mirror is made substantially highly reflecting at a wavelength matching the wavelengths of said first CW semiconductor diode pump laser (or said first CW laser diode array) and said second CW semiconductor diode pump laser (or said second CW laser diode array).

5. The alkali vapor laser of claim 1, wherein said input mirror of said laser cavity is a dichroic mirror, substantially transmitting radiation at a wavelength of said first CW semiconductor diode pump laser (or said first CW laser diode array) and said second CW semiconductor diode pump laser (or said second CW laser diode array), and substantially reflecting at a wavelength $\lambda_{o3}$ or $\lambda_{o4}$ matching the wavelength of said second series $D_{1'}$ or $D_{2'}$ transitions of said alkali vapor.

6. The alkali vapor laser of claim 1, wherein a thin-film polarizer plate optical element is employed to spatially overlap and combine the polarized radiation from said first CW semiconductor diode pump laser (or said first CW laser diode array) and said second CW semiconductor diode pump laser (or said second CW laser diode array), prior to directing the radiation of said first CW semiconductor diode pump laser (or said first CW laser diode array) and said second CW semiconductor diode pump laser (or said second CW laser diode array) onto said alkali vapor.

7. The alkali vapor laser of claim 1, wherein said alkali vapor is cesium and said one or more buffer gases is selected from the group consisting of helium and ethane.

8. The alkali vapor laser of claim 7, wherein said first CW semiconductor diode pump laser (or said first CW laser diode array) emits at a wavelength of either ~852 nm or ~895 nm, matching the wavelength of the first-series cesium $D_2$ and $D_1$ transition wavelengths, respectively, and wherein said second CW semiconductor diode pump laser (or said second CW laser diode array) emits at a wavelength of either ~921 nm or ~876 nm, whose laser active material is selected from the AlGaAs or InGaAsP semiconductor compound material systems.

9. The alkali vapor laser system of claim 7, wherein said laser cavity is resonant at a wavelength of either ~455 nm or ~459 nm, matching a wavelength of the second series cesium $D_{2'}$ or $D_{1'}$ transitions, respectively.

10. The alkali vapor laser of claim 1, wherein said alkali vapor is rubidium and said one or more buffer gases are selected from the group consisting of helium and ethane.

11. The alkali vapor laser of claim 10, wherein said first CW semiconductor diode pump laser (or said first CW laser diode array) emits at a wavelength of either ~780 nm or ~795 nm, matching the wavelength of the first series rubidium $D_2$ or $D_1$ transition wavelengths, respectively, and wherein said second CW semiconductor diode pump laser (or said second CW laser diode array) of emits at a wavelength of either ~776 nm or ~761 nm, whose laser active material is selected from the group of semiconductor compound material systems consisting of AlGaAs, AlGaAlP, and InGaAsP.

12. The alkali vapor laser system of claim 10, wherein said laser cavity is resonant at a wavelength of ~422 nm or ~420 nm, matching the wavelength of the second series rubidium $D_{2'}$ or $D_{1'}$ transitions, respectively.

13. A method for converting the substantially-divergent, multi-spatial-mode radiation of a first continuous wave (CW) semiconductor diode pump laser (or a first CW laser diode array) and a second CW semiconductor diode pump laser (or a second CW laser diode array) into near diffraction-limited, near-single-spatial-mode, coherent laser radiation at a wavelength shorter than that of either of said first CW semiconductor diode pump laser (or said first CW laser diode array) and said second CW semiconductor diode pump laser (or said second CW laser diode array), comprising the steps of:

depositing the radiation from said first CW semiconductor diode pump laser (or said first CW laser diode array) and said second CW semiconductor diode pump laser (or said second CW laser diode array) into an alkali/buffer-gas gain mixture through a two step sequential absorption process, defining a pumped volume, wherein said gain mixture is located within a cell placed in a laser cavity, wherein said mixture collisionally broadens the optical transitions, renders the transitions spectrally homogeneous with predominantly Lorentzian lineshapes, and facilitates increased spectral coupling between the pump radiation and alkali atom absorption, wherein the buffer gas collisionally relaxes doubly-excited alkali atoms from the $^2D_{3/2}$ level to the n+1 $^2P_{1/2}$ and $^2P_{3/2}$ levels (the upper laser levels for the two UC-DPAL laser transitions, n+1 $^2P_{3/2}$–n $^2S_{1/2}$ or the n+1 $^2P_{1/2}$–n $^2S_{1/2}$), and wherein the buffer gas composition and density are chosen so that this relaxation rate substantially exceeds the radiative relaxation rate of the $^2D_{3/2}$ level;

spatially over-lapping said pumped volume with the fundamental mode of the said laser cavity, wherein said laser cavity is designed to possess substantially higher losses for higher order spatial modes than for the fundamental mode; and extracting laser output power at the shorter wavelength in the fundamental spatial mode of said laser cavity by providing the proper amount of transmission of radiation at the output wavelength $\lambda_{o3}$ or $\lambda_{o4}$ matching the wavelengths of the $D_{2'}$ or $D_{1'}$ transitions of said alkali vapor.

14. A method for producing an up-conversion diode-pumped alkali laser (UC-DPAL), comprising:

forming a laser cavity with an input mirror and an output mirror, resonant at a wavelength $\lambda_{o3}$ or $\lambda_{o4}$ corresponding to wavelengths of the $D_{1'}$ or $D_{2'}$ transitions of an alkali atomic vapor;

providing a gain medium within said resonant cavity, said gain medium comprising a mixture of one or more buffer gases and an alkali vapor whose $D_{1'}$ or $D_{2'}$ transition wavelengths match that of said resonant laser cavity, wherein said mixture collisionally broadens the optical transitions, renders the transitions spectrally homogeneous with predominantly Lorentzian lineshapes, and facilitates increased spectral coupling between the pump radiation and alkali atom absorption, wherein the buffer gas collisionally relaxes doubly-excited alkali atoms from the $^2D_{3/2}$ level to the n+1 $^2P_{1/2}$ and $^2P_{3/2}$ levels (the upper laser levels for the two UC-DPAL laser transitions, n+1 $^2P_{3/2}$–n $^2S_{1/2}$ or the n+1 $^2P_{1/2}$–n $^2S_{1/2}$), and wherein the buffer gas composition and density are chosen so that this relaxation rate substantially exceeds the radiative relaxation rate of the $^2D_{3/2}$ level;

providing a first continuous wave (CW) semiconductor diode pump laser (or a first CW laser diode array) that can emit at a wavelength suitable for optically exciting said alkali vapor at a wavelength of the first series $D_1$ or $D_2$ transitions of said alkali vapor, wherein said first CW semiconductor diode pump laser (or said first CW laser diode array) is operably positioned for optically exciting said alkali vapor; and providing a second CW semiconductor diode pump laser (or a second CW laser diode array) that can emit at a wavelength suitable for further optically exciting alkali atoms excited by said first CW semiconductor diode pump laser, to the n $^2D_{3/2}$ (or similar) electronic level of the alkali atom, said first CW semiconductor diode pump laser (or said first (LW laser diode array) and said second CW semiconductor diode pump laser (or said second CW laser diode array) together producing a population inversion and laser emission at the wavelength of the second series $D_{1'}$ or $D_{2'}$ transitions of said alkali vapor, wherein said second CW semiconductor diode pump laser (or said second CW laser diode array) is operably directed onto said alkali vapor.

15. The method of claim 14, wherein said alkali vapor is selected from the group consisting of cesium (Cs), rubidium (Rb), potassium (K), sodium (Na) and lithium (Li).

16. The method of claim 14, wherein said one or more buffer gases are selected from the group consisting of 1) the subgroup of rare gases (xenon, krypton, argon, neon, and helium) and/or 2) the subgroup of light molecular gases (hydrogen, methane, ethane, propane; and their deuterated analogues).

17. The method of claim 14, wherein said output mirror of said laser cavity is partially transmitting at a wavelength $\lambda_{o3}$ or $\lambda_{o4}$ matching the wavelengths of said second series $D_{1'}$ or $D_{2'}$ transitions of said alkali vapor, permitting outcoupling of laser radiation generated within said optically pumped alkali vapor laser at a wavelength of $\lambda_{o3}$ or $\lambda_{o4}$, wherein said output mirror is made substantially highly reflecting at a wavelength matching the wavelengths of said first CW semiconductor diode pump laser (or said first CW laser diode array) and said second CW semiconductor diode pump laser (or said second CW laser diode array).

18. The method of claim 14, wherein said input mirror of said laser cavity is a dichroic mirror, substantially transmitting radiation at a wavelength of said first CW semiconductor diode pump laser (or said first CW laser diode array) and said second CW semiconductor diode pump laser (or said second CW laser diode array), and substantially reflecting at a wavelength $\lambda_{o3}$ or $\lambda_{o4}$ matching the wavelength of said second series $D_{1'}$ or $D_{2'}$ transitions of said alkali vapor.

19. The method of claim 14, wherein a thin-film polarizer plate optical element is employed to spatially overlap and combine the polarized radiation from said first CW semiconductor diode pump laser (or said first CW laser diode array) and said second CW semiconductor diode pump laser (or said second CW laser diode array), prior to directing the radiation of said first CW semiconductor diode pump laser (or said first CW laser diode array) and said second CW semiconductor diode pump laser (or said second CW laser diode array) onto said alkali vapor.

20. The method of claim 14, wherein said alkali vapor is cesium and said one or more buffer gases is selected from the group consisting of helium and ethane.

21. The method of claim 20, wherein said first CW semiconductor diode pump laser (or said first CW laser diode array) emits at a wavelength of either ~852 nm or ~895, matching the wavelength of the first-series cesium $D_2$ and $D_1$ transition wavelengths, respectively, and wherein said second CW semiconductor diode pump laser (or said second CW laser diode array) emits at a wavelength of either ~921 nm or ~876 nm whose laser active material is selected from the AlGaAs or InGaAsP semiconductor compound material systems.

22. The method of claim 20, wherein said laser cavity is resonant at a wavelength of either ~455 nm or ~459 nm, matching the wavelengths of the second series cesium $D_{2'}$ or $D_{1'}$ transitions, respectively.

23. The method of claim 14, wherein said alkali vapor is rubidium and said one or more buffer gases are selected from the group consisting of helium and ethane.

24. The method of claim 23, wherein said first CW semiconductor diode pump laser (or said first CW laser diode array) emits at a wavelength of either ~780 nm or ~795 nm, matching the wavelength of the first series rubidium $D_2$ or $D_1$ transition wavelengths, respectively, and wherein said second CW semiconductor diode pump laser (or said second CW laser diode array) of emits at a wavelength of either ~776 nm or ~761 nm, whose laser active material is selected from the group of semiconductor compound material systems consisting of AlGaAs, AlGaAlP, and InGaAsP.

25. The method of claim 23, wherein said laser cavity is resonant at a wavelength of ~422 nm or ~420 nm matching the wavelength of the second series rubidium $D_{2'}$ or $D_{1'}$ transitions, respectively.

* * * * *